Figure 1:
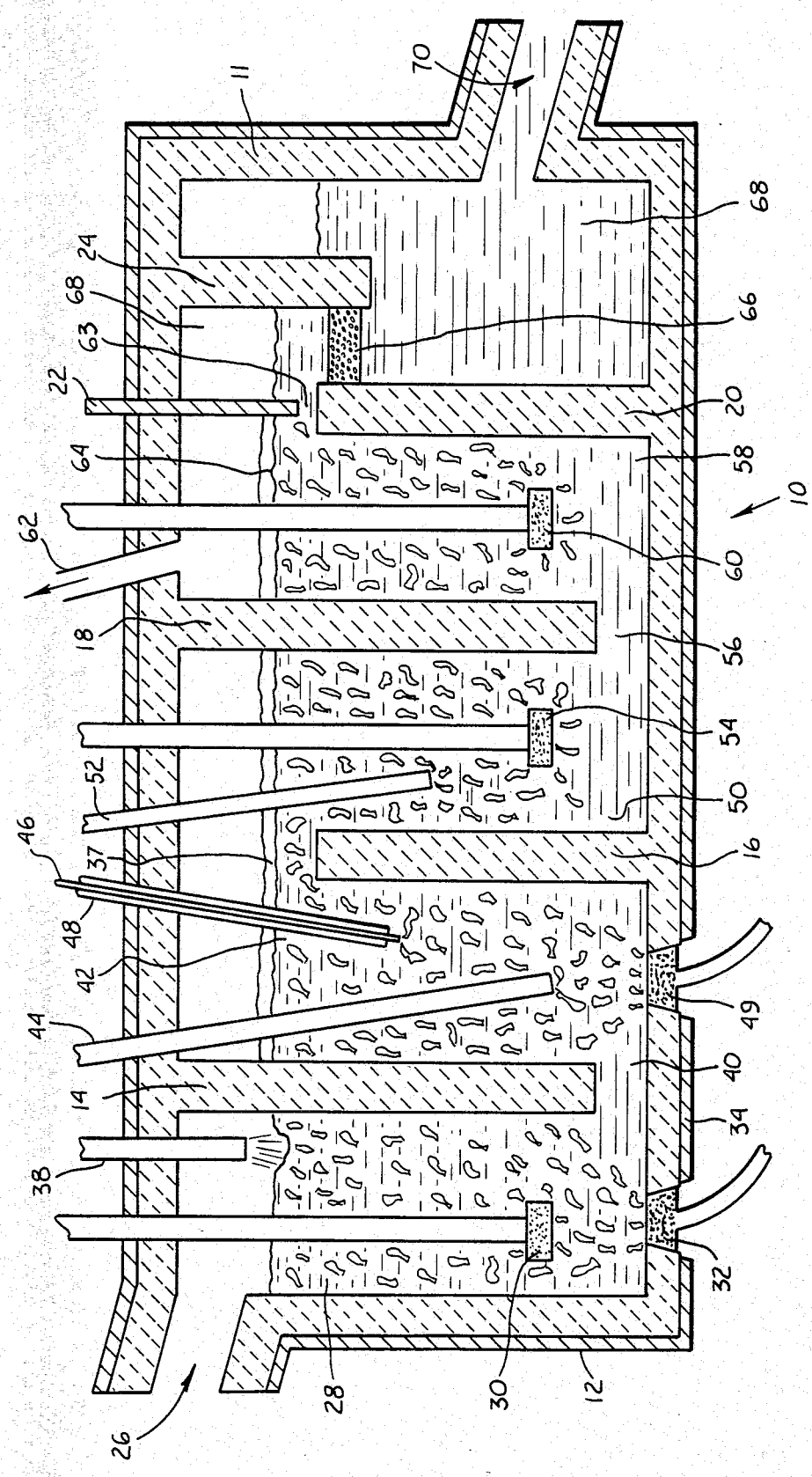

United States Patent [19]

Tyler et al.

[11] Patent Number: 4,515,630

[45] Date of Patent: May 7, 1985

[54] PROCESS OF CONTINUOUSLY TREATING AN ALLOY MELT

[75] Inventors: Derek E. Tyler, Cheshire; John C. Yarwood, Madison, both of Conn.

[73] Assignee: Olin Corporation, New Haven, Conn.

[21] Appl. No.: 523,328

[22] Filed: Aug. 15, 1983

[51] Int. Cl.³ .............................................. C21C 7/02
[52] U.S. Cl. .......................................... 75/53; 75/46; 75/120; 75/130 R
[58] Field of Search ................. 75/53, 46, 129, 130 R, 75/57, 58

[56] References Cited

U.S. PATENT DOCUMENTS

| | | | |
|---|---|---|---|
| 3,303,018 | 2/1967 | Goss | 75/51 |
| 3,336,132 | 8/1967 | McCoy | 75/46 |
| 3,467,167 | 9/1969 | Mahin | 75/53 |
| 3,702,243 | 11/1972 | Miltenberger | 75/57 |
| 3,754,892 | 8/1973 | Ando | 75/58 |
| 3,816,104 | 6/1974 | Ramachandran | 75/60 |

OTHER PUBLICATIONS

Houseman, "Continuous Steelmaking Processes," Steel Times, May, 1978, pp. 457-462.

Primary Examiner—Peter D. Rosenberg
Attorney, Agent, or Firm—Howard M. Cohn; Barry L. Kelmachter; Paul Weinstein

[57] ABSTRACT

A process for continuously treating a ferrous or non-ferrous alloy melt is disclosed. The melt is transferred through a plurality of interconnected zones. The carbon content of the melt is lowered in a first treatment zone. Then, the residual oxygen content of the melt is lowered in a second treatment zone by adding a deoxidizing agent to the melt. Active sulfide forming agents are added to the melt in the third treatment zone to lower the sulfur content of the deoxidized melt. The dissolved gas content of the desulfurized melt is lowered by flushing the melt with a gas in a fourth treatment zone. Next, the remaining particulates and films are removed from the melt by filtering the degassed melt in a fifth treatment zone.

16 Claims, 1 Drawing Figure

PROCESS OF CONTINUOUSLY TREATING AN ALLOY MELT

While the invention is subject to a wide range of applications, it is especially suited for the treatment of an alloy melt being transferred through a plurality of interconnected treatment zones and will be particularly described in that connection.

Existing processes for the treatment and refining of ferrous and non-ferrous alloy melts and in particular nickel alloy melts usually incorporate sequential batch type processing. Presently, the production of a high quality melt containing a low percentage of carbon, sulfur and impurities demands double melting treatments such as arc or induction melting and billet casting followed by conventional electroslag remelting or vacuum melting processing. It follows that a high quality casting of an alloy requires a relatively expensive and time consuming process.

The prior art does disclose methods of continuously refining or treating alloys in conjunction with continuous casting operations. However, none of the prior art teaches or suggests the unique sequence of melt treatment as set forth in the present invention. For example, U.S. Pat. No. 3,303,018 to Goss discloses "subjecting a continuous stream of molten iron to flow under super-gravitational forces while confined in a generally helical path, contacting the molten iron while traveling in said path with a flux for removing certain impurities from the iron, and subjecting the flux while traveling in said path to a gaseous jet stream directed against the flux with sufficient force to cause it to penetrate into the molten stream to increase the turbulent mixing of the flux with the molten iron."

Several examples of continuous processing of molten iron or production of steel have been disclosed in an article entitled "Continuous Steelmaking Processes" by Houseman, *Steel Times*, May, 1978, pages 457–462. This article includes the disclosure of transferring the melt between a plurality of vessels and providing separate processes for each of the different vessels. However, this reference clearly does not teach the specific sequence of processes which are taught in the present invention.

The prior art is also directed to specific processing of ferrous and non-ferrous metals such as nickel base and cobalt base alloys as described in U.S. Pat. No. 3,816,104 to Ramachandran. This reference discloses, for example, a "method of deoxidizing metal while maintaining the carbon content of the melt at a level about equal to or lower than the level prior to deoxidizing." This reference fails to teach the continuous process sequence of the present invention.

It is a problem underlying the present invention to provide a process for continuously treating an alloy melt to produce a relatively high quality melt suitable for continuous casting.

It is an advantage of the present invention to provide a process of continuously treating an alloy melt which obviates one or more of the limitations and disadvantages of the described prior processes.

It is a further advantage of the present invention to provide a process of continuously treating an alloy melt which results in relatively efficient and economic casting.

Accordingly, there has been provided a process for continuously treating an alloy melt. The melt is transferred through a plurality of interconnected treatment zones. The melt is decarburized in a first treatment zone. Then, the decarburized melt is deoxidized in a second treatment zone by adding a deoxidizing agent to the melt. Active sulfide forming agents are added to the melt in the third treatment zone to desulfurize the deoxidized melt. The desulfurized melt is degassed by flushing the melt with an inert gas in a fourth treatment zone. Next, particulates and films are removed from the degassed melt by filtering the degassed melt in a fifth treatment zone.

The invention and further developments of the invention are now elucidated by means of the preferred embodiment in the drawing.

The FIGURE is an illustration of a continuous treatment system for processing an alloy melt in accordance with the present invention.

It is common practice to treat and refine ferrous and non-ferrous alloys and in particular nickel alloy melts using sequential batch processes. However, as mentioned above, these processes are generally expensive and time consuming. Presently, the metals industry is attempting to avail itself of the advantages of continuous casting. The present invention is a method of producing alloys such as iron or nickel base alloys in a substantially continuous manner so as to be advantageously coupled with a continuous casting process. The continuous production in accordance with the present invention provides an improved control of the specifications of the finished alloy product as compared to the batch processes mentioned above. This results from controlling the quality of the metal at the optimum time, i.e. immediately before its use. With batch processing there is a tendency for the melt to reoxidize, resulfurize, regas or develop more inclusions because the melt is very reactive and tends to react with materials which it contacts. The extent of this reaction increases with the passage of time. Another advantage of the present invention is the ability to tailor the treatment to particular specifications which is important for small scale operations. The batch processes are by comparison large in scope in order to obtain the necessary efficiency.

While various types of apparatus might be utilized in carrying out the present invention, the reactor disclosed in the FIGURE is utilized for descriptive purposes. The reactor 10 may be comprised of a steel vessel lined with refractories 11. The specific refractories are chosen to insulate the vessel so as to provide thermal efficiency. They also resist melt and slag attack of the vessel which act to degrade the vessel and the melt being treated. Preferably, the refractory is inert to the particular melt being transferred through the reactor. Factors such as thermal efficiency, reactivity of materials and the cost must all be considered in deciding the most suitable refractory lining.

The vessel is preferably partitioned to prevent short circuiting of the metal flow and to get the maximum residence time of the melt in each particular treatment zone. It is also within the scope of the present invention to provide a reactor which is not partitioned. Also, the reactor could be a series of interconnected vessels. The melt would be transferred between the vessels using conventional techniques such as a gravity feed, an electromagnetic pump or a mechanical pump.

Referring to the drawing, the vessel 12 is divided into a series of separate interconnected chambers by partitions 12–24. Inlet 26 may be provided at one end of the vessel for directing the melt into a first treatment zone 28 in which the melt can be decarburized. This process basically consists of dispersing a decarburizing agent selected from the group consisting of oxygen, oxygen-argon, oxygen-nitrogen, carbon dioxide and readily reducible oxides of the primary elements forming the alloy melt. By this means, the carbon content of the melt is preferably lowered to between about 0.5% to about 0.001%. The gaseous decarburizing agent may be introduced into the melt by a device such as sparge ring 30 or any other conventional technique such as a lance. A reducible oxide of the primary element may be introduced as a powder in a sheath of metal compatible with the melt or a powder delivered with a carrier gas. These conventional injection techniques are illustrated or described in conjunction with other treatment zones more fully explained hereinbelow. Lowering the carbon content is accomplished by oxidizing the carbon in the melt to form carbon monoxide gas which bubbles out of the melt. To enhance this process, a porous plug 32 may be provided in the bottom surface 34 of the reactor 12. A gas, such as for example argon or nitrogen, is bubbled up through the porous plug to drive fresh melt to the melt surface. A lance 38 may be provided to discharge oxygen onto the melt surface so that the fresh melt being driven to the surface receives enough oxygen to efficiently decarburize the melt.

The melt is then transferred through passage 40 into the second treatment zone 42. Here, the decarburized melt is deoxidized by adding a deoxidizing agent to the melt. The deoxidizing agent is fed into the treatment zone in order to lower the oxygen content of the melt to less than about 0.01%. The deoxidizing agent is preferably selected from the group consisting of aluminum, zirconium, magnesium, calcium, titanium and silicon and delivered into the melt within treatment zone 42 using any number of conventional techniques. For instance, a tube 44 may inject the deoxidizing agent in a powder form with a carrier gas. The carrier gas is substantially inert and may be either argon or nitrogen. A feed wire 46 constructed of the deoxidizing agent and preferably shrouded with a gas such as nitrogen or argon in a tube 48 may be used together with or independent of the tube 44. Other techniques include injecting a powder or a feed wire with a flux or slag coating and shooting slugs of the deoxidizing agent directly into the melt within zone 42. A porous plug 49 may be provided in the bottom surface 34 of the vessel 12 to inject a gas such as argon into the treatment zone 42 as described with regards to plug 32. If desirable, a sparge ring (not shown) similar to ring 30 may be provided in treatment zone 42 to inject inert gas in conjunction with plug 48 or alone. The gas injection serves the same function as the gas injected through porous plug 48. In addition, this gas sparging promotes separation of the forming oxide inclusions from the bulk of the melt to its surface which may advantageously be covered with a flux 37 designed to absorb them.

The deoxidized melt then passes over the partition 16 and into a third treatment zone 50, downstream from zone 42, wherein the deoxidized melt is desulfurized to less than about 0.01% of the melt. The desulfurizing is accomplished by adding active sulfide forming agents into the melt. These agents include CaO, MnO, BaO, CaSi, $CaC_2$, Ca and Mg. The active sulfide forming agents may be present as part of slag cover 37 or may be injected in powder form with a carrier gas stream through a tube 52 in the manner corresponding to the injection through tube 44 in zone 42. Further, any other of the conventional injection techniques of the type associated with zone 42 may be used independently or in conjunction with each other and with tube 52. A sparge ring 54 may be provided to supply an inert gas or to function in the same manner as porous plugs 32 and 48. It is also within the scope of the present invention to provide a porous plug (not shown) in the bottom surface of the vessel to be used alone or in conjunction with the sparge ring 54 as desired to promote reaction of the metal with the slag and separation of the products of reaction into the slag within treatment zone 50.

The melt continues flowing downstream through a passageway 56 under a partition 18. The melt flows into treatment zone 58 located adjacent to and downstream from zone 50. The melt is degassed in this fourth treatment zone to less than about 0.0005% hydrogen and preferably less than about 0.0002% hydrogen. Primarily, the degassing removes the hydrogen in the melt. However, it may also be desirable to remove other dissolved gases such as nitrogen. Generally, the nitrogen would be reduced to less than about 0.02% and preferably less than about 0.005% of the melt. Elimination of these dissolved gases is important to eliminate porosity and to improve mechanical properties of semi-finished and finished products. The degassing is preferably accomplished by injecting an inert gas such as argon into the melt. Nitrogen may be used where its elimination is not a concern. A conventional sparge ring 60 as shown or other conventional techniques such as provision of a porous plug (not shown) may be employed to inject the gas. An evacuation outlet 62 is provided for the escape of any of the gases. If desired, the degassing may be accomplished or enhanced by drawing a vacuum above the melt in treatment zone 58. In addition, a protective slag or flux 64 may be employed on the melt surface. The gas sparging in this zone provides advantageous further separation of unwanted non-metallic inclusions generated in previous operations.

The degassed melt continues downstream and flows over partition 20. A movable partition 22 is provided above partition 20 to form a passageway 63 through which the melt flows. The partition 22 may be moved out of the vessel 12 if desired. It is primarily provided so that during start-up conditions the flux 64, above the melt in the fourth treatment zone, does not flow downstream into the filter 66. However, once the reactor is in a substantially steady state condition, the partition 22 may be moved away from partition 20 to allow an increased flow rate of melt from the fourth treatment zone 58 to the fifth treatment zone 68. Although the partition 22 is provided in the preferred embodiment, it is also within the terms of the present invention to have a fixed partition 22 or to not use it at all in the vessel 12.

The degassed melt is filtered in the fifth treatment zone 68 to remove remaining particulates and films. The fifth treatment zone is positioned downstream and adjacent to the fourth treatment zone so that the melt flows over the partition 20 and through a filter 66. The filter may be of any conventional design such as a plate filter which is non-reactive with the melt. It is preferably selected from a material such as alumina, mullite, zirconia and magnesia. The filter can take the form of a ceramic foam or a ceramic extruded honeycomb. Further, if desired a conventional bed filter with chips of refractory materials may be used for the filtering process. If desirable, the filter elements may be flux coated. The filter removes as much of the solid particles as possible.

Finally, the melt passes through an outlet 70 where it can be delivered to any desirable device such as a continuous casting apparatus.

An important aspect of the treatment is the residence time of the melt in each of the treatment zones within the reactor 10. The reactor sections must, therefore, be sized to provide sufficient residence time to allow the reaction or refinement operations to proceed to the extent required. Residence time requirements will accordingly depend on inlet impurity content, outlet refinement requirements and melt chemistry.

The patents and publication set forth in this application are intended to be incorporated by reference herein.

It is apparent that there has been provided in accordance with this invention a process of continuously treating a ferrous or non-ferrous alloy melt which satisfies the objects, means and advantages set forth hereinabove. While the invention has been described in combination with the embodiment thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

We claim:

1. A process of continuously treating an alloy melt comprising the steps of:
   a. transferring said melt through a plurality of interconnected treatment zones;
   b. decarburizing said melt to between about 0.5% to about 0.001% of the alloy melt in a first treatment zone;
   c. deoxidizing the decarburized melt to lower the oxygen content of said melt to less than about 0.01% by adding a deoxidizing agent to said melt in a second treatment zone;
   d. desulfurizing the deoxidized melt to lower the sulfur content of said melt to less than about 0.01% by adding active sulfide forming agents to said melt in a third treatment zone;
   e. degassing said desulfurized melt to lower the gas content of said melt to less than about 0.0005% $H_2$ by flushing said melt with a gas in a fourth treatment zone; and
   f. removing particulates and films from said melt by filtering the degassed melt in a fifth treatment zone.

2. The process of claim 1 wherein said step of decarburizing said melt comprises the steps of dispersing in said first treatment zone a decarburizing agent selected from the group consisting of oxygen, oxygen-argon, oxygen-nitrogen, carbon dioxide and readily reducible oxides of the primary elements forming the alloy melt.

3. The process of claim 2 wherein said step of deoxidizing occurs in a second treatment zone positioned downstream from said first treatment zone.

4. The process of claim 3 including the step of selecting said deoxidizing agent from the group consisting of aluminum, zirconium, magnesium, calcium, titanium and silicon.

5. The process of claim 4 including the steps of providing said deoxidizing agent in powder form and delivering said powder into said melt with a carrier gas stream.

6. The process of claim 5 wherein said carrier gas stream is an inert gas.

7. The process of claim 4 including the step of delivering said deoxidizing agent into said melt with a feed wire.

8. The process of claim 4 wherein said step of desulfurizing the deoxidized melt occurs primarily in a third treatment zone positioned downstream from said second treatment zone.

9. The process of claim 8 wherein the step of lowering the sulfur content includes selecting said active sulfide forming agents from the group consisting of CaO, MnO, BaO, CaSi, $CaC_2$, Ca and Mg.

10. The process of claim 9 wherein said step of lowering the dissolved gas content occurs primarily in a fourth treatment zone positioned downstream from said third treatment zone.

11. The process of claim 10 wherein said step of flushing with a gas for degassing said melt consists of selecting a gas from the group consisting of argon and nitrogen.

12. The process of claim 8 wherein said fifth treatment zone is positioned downstream from said fourth treatment zone.

13. The process of claim 12 wherein said step of filtering includes providing a plate filter being non-reactive with said melt for filtering said melt.

14. The process of claim 13 including the step of selecting said filter of a material from the group consisting of alumina, mullite, zirconia and magnesia.

15. The process of claim 12 wherein said melt is a nickel base alloy.

16. The process of claim 12 wherein said melt is an iron base alloy.

* * * * *